June 23, 1964  F. S. JENKINS ETAL  3,138,792
SUPERVISORY SYSTEM
Filed May 26, 1960  3 Sheets-Sheet 1

INVENTOR.
FELTON S. JENKINS
ARLON D. KOMPELIEN
BY
ATTORNEY

June 23, 1964

F. S. JENKINS ETAL 3,138,792

SUPERVISORY SYSTEM

Filed May 26, 1960

INVENTOR.
FELTON S. JENKINS
ARLON D. KOMPELIEN
BY
ATTORNEY

June 23, 1964   F. S. JENKINS ETAL   3,138,792
SUPERVISORY SYSTEM
Filed May 26, 1960   3 Sheets-Sheet 3

INVENTOR.
FELTON S. JENKINS
BY ARLON D. KOMPELIEN

ATTORNEY

United States Patent Office 3,138,792
Patented June 23, 1964

3,138,792
SUPERVISORY SYSTEM
Felton S. Jenkins and Arlon D. Kompelien, Richfield, Minn., assignors to Minneapolis-Honeywell Regulator Company, Minneapolis, Minn., a corporation of Delaware
Filed May 26, 1960, Ser. No. 31,895
8 Claims. (Cl. 340—213)

This invention relates generally to the field of self-supervised electrical apparatus and is more particularly related to a method and means for providing a self-supervisory function in a manner that is substantially tamper and defeat proof.

In prior systems wherein a remote location is included in an electrical circuit embodied in electrical apparatus, it has been determined that a desirable and sometimes necessary feature is that of providing a self-supervisory function so that indication may be had of unauthorized interference with, or failure of, the electrical connecting circuit. This self-supervisory feature, or function, has been used, for instance, in prior art alarm systems wherein it must be known at all times whether or not the system is capable of operation in the sense that electrical continuity remains uninterrupted. Particularly with regard to security alarm systems, it is necessary to provide a self-supervising function that is not only foolproof but is completely tamper or defeat proof so that various types of sensing devices connected to an electrical circuit in a remote location will be able to provide signals to sound an alarm when the particular condition to which they are designed to be responsive to, occurs. One common practice in this general field has been to utilize a circulating current through the entire system and to provide equipment responsive to the absense of this circulating current, which may be of a particular value, to provide an indication that the continuity of the electrical circuitry has been altered either by accident or by design.

In our invention, we provide a method and apparatus for utilization in an electrical circuit of the type above described to allow operation that eliminates the possibility of an attempt to defeat, or otherwise tamper with, the electrical circuitry utilized in this apparatus.

It is therefore an object of our invention to provide a novel method of operation of the supervisory function of systems in which an electrical circuit is used to connect a remotely located station with a central location.

It is a further object of our invention to provide apparatus for inclusion in an electrical circuit interconnecting a remote and central location so that a tamper and defeat proof self-supervisory operation may be obobtained.

These and other objects of our invention will be apparent from a reading and consideration of the appended specification, claims and drawing, in which:

Figure 1:
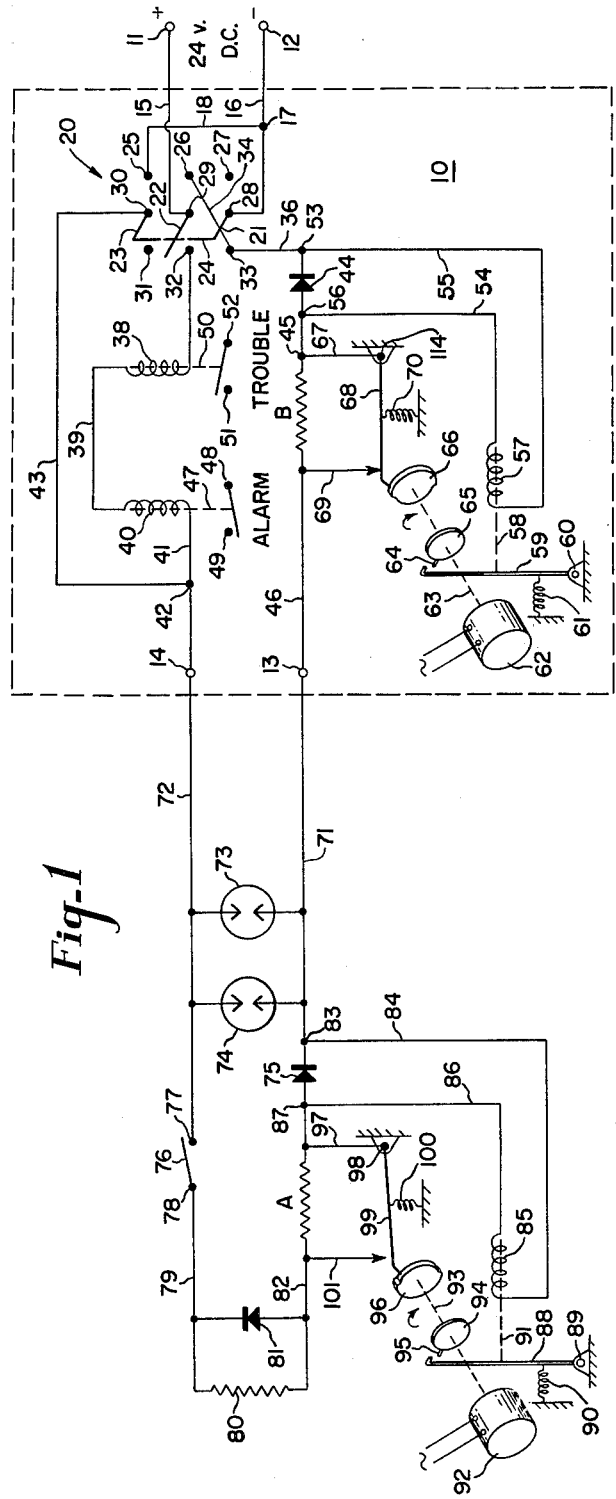
FIGURE 1 is a schematic drawing of a security alarm system utilizing the principles of our invention for self-supervisory operation.

Referring now to FIGURE 1, there is shown electrical apparatus enclosed in a dotted line 10 which might be a central guard station and which includes an alarm relay 40, a trouble, or supervisory relay 38, and a variable impedance B including apparatus for varying the impedance B including apparatus for varying the impedance of variable impedance B in a predetermined manner. A remote station connected through electrical conductors 71 and 72 to the central station 10, includes a variable impedance A, a terminating impedance 80, a normally closed intruder operated switch 76 and a plurality of normally open temperature responsive devices 73 and 74. The entire apparatus comprises a fire and burglar or security alarm system including the central station, or location 10 connected to the remotely located sensors through electrical conductors 71 and 72.

Central supervisory station 10 includes a pair of terminals 11 and 12 for connection to a suitable source of direct current, here a 24 volt direct current source with the polarities as shown. A further pair of terminals 13 and 14 are provided for connection to remote sensing and detecting elements through apropriate conductors. Further included in central supervisory station 10 is a triple-pole, double-throw switching mechanism indicated generally by the reference character 20 and which includes three movable contacts 21, 22, and 23, having terminals 28, 29, and 30 respectively, adapted for simultaneous contact either with stationary contacts 25, 26, and 27 or stationary contacts 31, 32, and 33. Movable contact 22 is connected to the positive terminal 11 through lead 15 and terminal 29 and movable contact 21 is connected to negative terminal 12 through lead 16 and terminal 28. Stationary contact 25 is connected to negative terminal 12 through lead 18, terminal 17 and lead 16. Stationary contact 26 is directly connected to stationary contact 33 through lead 34. Stationary contact 32 is connected to central supervisory station output terminal 14 through trouble or supervisory relay winding 38, lead 39, alarm relay winding 40 and lead 41. Stationary contact 33 is connected to output terminal 13 through lead 36, terminal 53, diode 44, terminal 56, terminal 45, series impedance B and lead 46. Movable contact 23 is connected to output terminal 14 through terminal 30, lead 43, terminal 42 and lead 41, Diode 44 has connected in parallel, synchronizing relay winding 57 through leads 54 and 55 connected to terminals 56 and 53 respectively. Series impedance B may be shunted through a circuit including lead 69, movable contact arm 68 and lead 67 connected in parallel with the series impedance B. Movable contact arm 68 is biased toward motor driven cam means 66 through spring 70 and coacts with the motor driven cam means to alternately close and open the shunting circuit around the series impedance B. Synchronous motor means 62, adapted to be energized from a suitable source of alternating current, is drivingly connected to synchronizing cam 65, having projection 64 thereon, and cam means 66 through driving means 63 and is driven in the direction indicated by the arrow. It may be noted that the cam means 66 is adapted to be a "half time" cam that is adapted to cause movable contact arm 68 to close the shunt circuit around series impedance means for one-half of a revolution and to open the circuit for one-half of a revolution. Synchronizing cam 65, having projection 64 extending from its periphery, is adapted to coact with armature 59 associated with synchronization relay winding 57 through driving means 58 and adapted to pivot about axis 60 so that upon energization of relay winding 57 it may coact with the projection 64 to stop the rotational movement of the cam means 66 and synchronizing cam means 65. Upon de-energization of the synchronizing relay winding 57, spring biasing means 61 serves to prevent engagement of the armature 59 with projection 64 on synchronizing cam 65. Trouble, or supervisory, relay 38 includes a pair of contacts 51 and 52 operable through driving means 50. The contacts may be connected to suitable annunciating apparatus and are adapted to be maintained in an open condition during normal operation of this embodiment. Alarm relay 40 includes a pair of contacts 48 and 49 operable by driving means 47 and which may be connected to suitable annunciator means to provide an indication of an alarm condition. The alarm contacts 48 and 49 are adapted to be maintained in an open condition during normal state of the alarm apparatus and to be closed upon the existence of an alarm condition.

Connected in series between terminals 13 and 14 of central supervisory station 10 are; conductor 71, terminal 83, diode 75, terminal 87, series impedance A, lead 82, series resistance 80 having diode 81 in parallel therewith, conductor 79, terminal 78, movable contact 76, terminal 77 and lead 72 connected to terminal 14. Connected in parallel across terminals 83 and 87 of diode 75 is a supervisory synchronizing relay winding 85 through leads 84 and 86 respectively. Armature 88 is drivingly connected to relay winding 85 through driving means 91 and is adapted to pivot about axis 87 and is further connected to a biasing means 90. Series impedance A may be shunted by a circuit including lead 101, contact arm 99, biased by spring 100 and adapted to pivot about axis 98, and a lead 97. Contact arm 99 is adapted to complete the shunt circuit around series impedance A through cooperation with cam 96, of suitable shape, that is driven in the direction shown by the arrow from the output of a synchronous motor 92 through driving means 93. Driving means 93 is also operable to rotate synchronizing cam 94, having a projection 95 thereon, in synchronism with the cam means 96. Motor 92 may be energized from a suitable source of alternating current. Motor 92 may be connected to driving means 93 through a slip clutch means (not shown).

Figure 2:
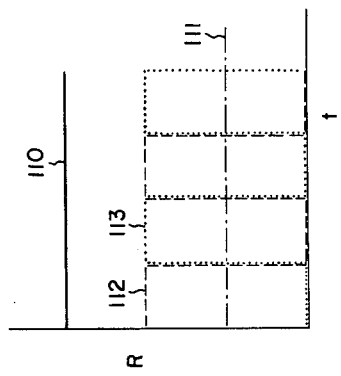
FIGURE 2 is a graphical illustration of the apparatus shown in FIGURE 1.

FIGURE 2 contains a number of curves indicating the resistance or impedance across various portions of the circuit; curve 111 illustrates the resistance of the impedance 80; curve 112 illustrates the resistance of the impedance A; curve 113 illustrates the resistance of impedance B; and curve 110 illustrates the total resistance in the circuit connected across contact terminals 32 and 33.

*Operation of FIGURE 1*

A brief consideration of the normal operation of security alarm systems of one general type, indicates that the normal operation is such that a trouble, or supervisory relay and an alarm relay are series connected with a circuit containing current limiting impedances and normally closed series connected detecting elements and normally open parallel connected detecting elements. Under normal operation, the value of the current flowing in the series loop is such that the trouble, or supervisory relay is energized to the extent that it will maintain its associated contacts in an open condition and the alarm relay is not energized to the extent that it will close its associated contacts. Under these circumstances, an annunciator means associated with the trouble relay contacts will remain de-energized and an annunciator means connected with the alarm relay contacts will remain de-energized. It may thus be seen that, for proper operation, it is desirable to have a substantially constant current flowing in the series circuit. The value of the constant current will be dependent upon the characteristics of the trouble and alarm relay windings and may be easily determined by one skilled in the art. In the embodiment shown in FIGURE 1, the necessary value of series impedance to be maintained is illustrated by the curve 110 in FIGURE 2 which is made up of two components, the first is the impedance contributed by the resistor 80 and the second is the impedance of either resistor A or B which is added to that of resistor 80. It may therefore be stated that the normal operation of the embodiment of our apparatus shown in FIGURE 1 is such that a predetermined constant value of series impedance in the circuit will, for a given voltage source, allow a current to flow such that will sufficiently energize trouble relay winding 38 to maintain its associated contacts in an open condition and will not tend to energize alarm relay winding 40 to such an extent that it will close its associated contacts. It may be noted from FIGURE 2 that, at any given instant in time, the impedance, or resistance, of either resistor A or resistor B must be added to that of resistor 80 to provide the total desired value of resistance, or impedance in the circuit. In the present embodiment of our invention, this may be attained by constructing the cam means 66 and 96 so that actuation of contact arms 68 and 99 to close the associated shunt circuits around resistances B and A respectively will occur for exactly one-half revolution for each cam means. In this manner, the resistance of resistor A or the resistance of resistor B is always in circuit with the resistance of resistor 80 so that a substantially constant resistance is present in the series loop to thereby limit the current to a predetermined value.

Initially, and periodically during the day to day use of such an alarm system as illustrated in FIGURE 1, it is necessary to synchronize the operation of the cam means 66 and 96 such that resistances A and B are alternately complementary synchronously connected into the circuit so that each is in the circuit for one-half of the total time so as to present a constant value of resistance as illustrated by curve 110 in FIGURE 2. This may be accomplished by connecting movable contacts 21, 22, and 23 on switch 20 to stationary contacts 27, 26, and 25 so that a circuit may be completed from negative terminal 12, through lead 16, terminal 17, lead 18, stationary contact 25, movable contact 23, terminal 30, lead 43, terminal 42, lead 41, terminal 14, lead 72, terminal 77, movable contact 76, terminal 78, lead 79, diode 81, lead 82, series impedance A, terminal 87, lead 86, synchronization relay winding 85, lead 84, terminal 83, lead 71, terminal 13, lead 46, series impedance B, terminal 45, terminal 56, lead 54, synchronization relay winding 57, lead 55, terminal 53, lead 36, stationary contact 33, stationary contact 26, movable contact 22, terminal 29 and through lead 15 to positive terminal 11. In this manner, with the polarities shown, the diodes 81, 75 and 44 are properly poled so that synchronization relay windings 85 and 57 are energized to thereby attract their respective armatures 88 and 59 into position to intercept the projections 95 and 64 on synchronizing cams 94 and 65 respectively. Synchronizing cams 94 and 65 are suitably connected to driving means 93 and 63 respectively so as to maintain a locked predetermined relationship with the cam means 96 and 66. A slip clutch means connecting the respective driving means to the motor means (not shown) may be desirable in certain applications. Upon energization of the synchronization relay windings 85 and 57, the rotation of driving means 93 and 63 continues until the projections 95 and 64 on synchronization cams 94 and 65 are engaged. Since the cams are connected to the respective driving means according to a predetermined arrangement, the cam means 96 and 66 are positioned in synchronism in accordance with the desired operation of the shunting circuits around the series impedances A and B when the respective projections 95 and 64 are engaged by the armatures of the respective synchronization relays 85 and 57. Upon de-energization of the synchronization relays, the uniform synchronous speed of the motors 92 and 62, due to connection to a common alternating current power source such as is commercially available in the vast majority of areas in which this equipment may be utilized, the rotation of the cam means 96 and 66 will be such as to obtain the desired operation as illustrated by the curves 112 and 113 in FIGURE 2. De-energization of the synchronizing relay means is accomplished by opening switch 20 from its right hand position in which movable contacts 21, 22, and 23 are engaged with stationary contacts 27, 26, and 25.

To place the apparatus in its normal operating condition, the movable contacts 21, 22, and 23 on switch 20 are moved to the left hand position to engage stationary contacts 33, 32, and 31. In this position a circuit may be traced from positive terminal 11 through lead 15, terminal 29, movable contact 22, stationary contact 32, trouble relay winding 38, lead 39, alarm relay winding 40, lead 41, terminal 42, terminal 14, lead 72, terminal 77, movable contact 76, terminal 78, lead 79, resistor 80, lead 82, series impedance A, terminal 87, diode 75, terminal 83, lead 71, terminal 13, lead 46, lead 69, movable arm 68, lead 67, terminal 45, terminal 56, diode 44, terminal 53, lead 36, stationary contact 33, movable contact 21, terminal 28, terminal 17, and lead 16 to negative terminal 12. In this normal operating condition, a current of a value determined by the combined resistances of resistance 80 and one or the other of resistances A or B will flow through the series circuit. This, as explained above, is sufficient to prevent actuation of the respective annunciators connected to trouble output terminals 51 and 52 and alarm output terminals 48 and 49. As is well known in the art, the increased current flow due to the closure of the normally open contacts associated with the detection devices 73 and 74 will energize alarm relay winding 40 to an extent to close the alarm contacts 48 and 49 and thereby actuate an alarm annunciator circuit to indicate to supervisory personnel that an alarm condition exists. The normally open type of detection apparatus may, for instance, comprise a thermostatic element that closes its contact upon a predetermined rise in temperature to indicate a fire alarm. It is contemplated that the normally closed switch indicated by movable contact 76 and terminal 77 might be in the form of one type of magnetically operated door switch that, upon opening of a door, or window, opens the switch to interrupt the series circuit. In this event, the current through the trouble relay winding 38 is interrupted and the contacts 51 and 52 are closed to thereby actuate an annunciator circuit to indicate the existence of an open circuit and/or the existence of an intruder having passed through the series switch.

In order to disable the apparatus, one seeking to do so, when confronted with apparatus embodying the principles of our invention, now finds himself faced with the problem of determining the necessary total resistance required in the series loop emanating from the output terminals 13 and 14 on the central supervisory station 10, determining what proportion of that is contributed by the series impedance A and the series impedance 80, determining the cyclical rate at which the series impedance A is alternately inserted and removed from the series circuit, and then inserting such equipment as is necessary to accomplish this function at some point in the series circuit emanating from terminals 13 and 14 intermediate those terminals and the area which is sought to be disconnected from the security system and simultaneously disconnecting the series impedances already in the area to be effectively removed from alarm and trouble supervision. It should be readily apparent to one skilled in the art that to accomplish all of these individual acts simultaneously is so unlikely that our invention may be considered to be tamper and defeat proof. It ought to be recognized that additional security measures might be taken in utilizing this equipment, for instance, the value of the series impedances A and B might be changed on a predetermined schedule to prevent the exact values from falling into unauthorized hands.

Figure 3:
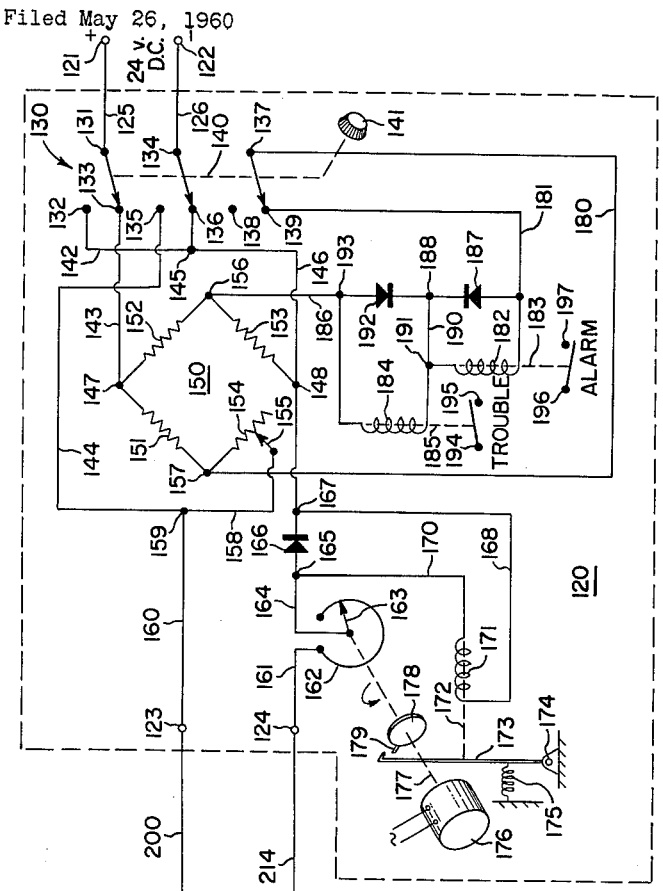
FIGURE 3 is a schematic diagram of a second embodiment of our invention shown in a security alarm system.

FIGURE 3 illustrates a further embodiment of the principles of our invention in which a continuously variable impedance, located at a central supervisory station 120, is operated in synchronism with a remotely located, continuously variable impedance element so as to present a substantially constant impedance in an electrical circuit.

Central suprevisory panel 120 includes a pair of output terminals 123 and 124 to be connected to conductors leading to an area to be supervised and a further pair of terminals 121 and 122 to be connected to a suitable source of direct current voltage of polarities as shown. Central station 120 also includes a switch means 130 having movable contacts 131, 134, and 137 and stationary contacts 132, 133, 135, 136, 138, and 139. Movable contact 131 is connected to positive terminal 121 through lead 125 and is operable through driving means 140 operated by knob 141 between stationary contacts 132 and 135. Stationary contact 134 is connected to negative terminal 123 through lead 126 and is operable through driving means 140 between stationary contacts 135 and 136. Movable contact 137 is operable between contacts 138 and 139 is accordance with the operation of knob 141 through driving means 140. It may further be noted that the movable contacts 131, 134, and 137 are ganged in the sense that they may be connected to stationary contacts 132, 135, and 138 respectively or stationary contacts 133, 136, and 139 respectively. By selective operation of the knob 141, the output terminals 123 and 124 of central station 120 may be connected across a portion of a Wheatstone bridge 150 so that the impedance of an external circuit connected across said output terminals forms and becomes part of a leg of the Wheatstone bridge or may be connected directly to the source of direct current voltage for a purpose to be explained below. Wheatstone bridge 150 includes input terminals 147 and 148 and output terminals 156 and 157. Input terminal 147 is directly connected to stationary contact 133 through lead 143 and input terminal 148 is connected to stationary contact 136 through lead 146 and terminal 45 and to stationary contact 132 through lead 142 connected to terminal 145. Input terminal 147 is connected to output terminal 157 through resistor 151; and to output terminal 156 through resistor 152; and input terminal 148 is connected to output terminal 157 through a circuit including terminal 167, diode 166 having synchronization relay winding 171 connected in parallel therewith through leads 170 and 168, terminal 165, lead 164, wiper 163, impedance element 162, lead 161, output terminal 124, through an external series circuit to be explained below, to output terminal 123, lead 160, terminal 159, lead 158, rheostat wiper 155, rheostat impedance element 154 to output terminal 157 and to output terminal 156 through resistor 153. Connected in series across output terminals 156 and 157 of Wheatstone bridge 150 are a trouble relay winding 184 having diode 192 in parallel therewith and alarm relay winding 182 having a diode 187 in parallel therewith through a circuit including lead 180, movable contact 137 on switch 130, stationary contact 139, lead 181, relay winding 182, terminal 191, relay winding 182, terminal 191, relay winding 184, terminal 193 and lead 186. Output terminal 123 is also connected to stationary contact 135 on switch 130 through lead 144, terminal 159 and lead 160. Trouble relay 184 and alarm relay 182 are adapted to actuate contacts 194–195 and 196–197 respectively to in turn actuate suitable annunciating equipment. Motor means 176, adapted for connection to a suitable source of alternating current, may be connected to a driving means 177 through a slip clutch assembly (not shown). Driving means 177 has fixedly connected to it a synchronizing cam 178 and wiper 163 in a predetermined relationship, the purpose of which will be shown below. Synchronizing cam 178 has projecting therefrom, a projection 179 that is adapted to coact with armature 173 that is driven by connecting means 172 on relay 171. Armature 173 may pivot about axis 174 and is spring biased away from projection 179 by spring means 175. In summary, central supervisory station 120 includes a Wheatstone bridge, alarm relays responsive to the polarity of its output, a pair of output terminals connected in series with one leg of the bridge including a periodically variable resistance element and a source of reversible polarity direct current for energizing the supervisory station.

Remotely located may be parallel connected detectors 215 and 216 and series connected detector shown as a normally closed switch 202. A circuit including these and fixed and variable impedance means is shown connected to terminals 123 and 124 on central station 120. The circuit includes lead 200, terminal 201, switch 202, terminal 203, lead 204, terminating impedance, or resistor 205 having diode 206 in parallel therewith, lead 207, wiper 208, impedance, or resistance element 209, lead 210, terminal 211, diode 212, terminal 213 and lead 214 connected to output terminal 124. A pair of normally open detection elements are connected in parallel with the output terminals 123 and 124 as shown by the normally open devices 216 and 215 connected from lead 200 to lead 214. Synchronization relay winding 218 is connected in parallel with diode 212 a circuit including terminals 211, lead 219, relay winding 218, lead 217, and terminal 213. Wiper 208 is rigidly connected to driving means 225 along with synchronization cam 226 so that a predetermined angular relationship is maintained. Driving means 225 may be connected to motor means 224 through a slip-clutch arrangement for purpose to be explained below. Motor 224 may be energized from a suitable source of alternating current (not shown). Synchronization cam 226 includes a projection 227 that is adapted to coact with armature 220 that is in turn adapted to pivot about an axis 221 and is spring biased through spring means 222 in a direction away from the normal travel of projection 227. Energization of synchronization relay winding 218 serves to move armature 220 to the right against the force of spring means 222 through driving means 252.

Figure 4:
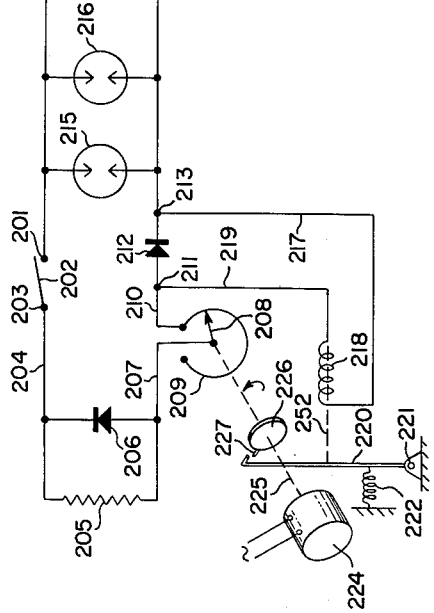
FIGURE 4 is a graphical illustration of the operation of the apparatus shown in FIGURE 3.
Figure 4:
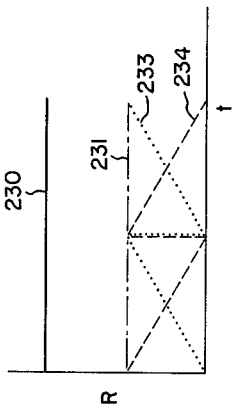

FIGURE 4 includes a number of curves illustrating the change of resistance with time of the several elements included in the series circuit forming one leg of the Wheatstone bridge 150. Curve 231 illustrates the constant resistance provided by the end of the line, or termination resistance 205, curve 233 illustrates the variation in resistance provided by the coaction of wiper 208 with resistance 209 and curve 234 illustrates the variation of resistance supplied by the coaction of wiper 163 with resistance element 162. The curve 230 illustrates the total resistance, that is supplied to the leg of the Wheatstone bridge 150 between output terminal 157 and input terminal 148.

*Operation of FIGURE 3*

In placing the apparatus of FIGURE 3 into operation, it is necessary to first insure that the operation of the variable impedance, or resistance elements inserted in the series circuit connected to the Wheatstone bridge is complementary synchronous in that as the impedance of one element in series with the circuit increases that of the other must decrease so as to present a substantially constant impedance in the series circuit. This may be done by rotating knob 141 such that the movable contacts associated therewith are placed in their uppermost position, that is contact 131 is connected to stationary contact 132 and contact 134 is connected to stationary contact 135. This removes the alarm and trouble relays from the circuit and applies a potential of suitable polarity so that a current flow may be traced from stationary contact 132 back to stationary contact 135 through a circuit including lead 142, terminal 145, lead 146, terminal 148, terminal 167, lead 168, synchronization relay winding 171, lead 170, terminal 165, lead 164, wiper 163, impedance 162, lead 161, terminal 124, lead 214, terminal 213, lead 217, synchronization relay winding 218, lead 219, terminal 211, terminal 210, impedance 209, wiper 208, lead 207, diode 206, lead 204, terminal 203, switch 202, terminal 201, lead 200, terminal 123, lead 160, terminal 159, and lead 144 to terminal 135. This serves to place armatures 173 and 220 in a position to intercept the projections 179 and 227 on synchronization cams 178 and 226 respectively. The respective motor means connected to driving means for the two variable impedance units may continue to operate because of a slip-clutch connection arrangement (not shown). After a suitable interval, determined by the time of one revolution of the driving means 177 and 225, wipers 163 and 208 will be positioned in a predetermined manner such that the total resistance included in the series circuit between the two will be of a predetermined value and upon deenergization of synchronization relay windings 171 and 218 the wipers will rotate in unison due to the inherent characteristics of the synchronous motors utilized for driving the wipers. This is accomplished by rotating knob 141 to place the movable contacts of switch means 130 in the position shown in FIGURE 3. This serves to energize Wheatstone bridge 150 from the 24 volt direct current source connected to terminals 121 and 122.

Although other arrangements may appear to those skilled in the art, the particular relay arrangement utilized to sense the output of Wheatstone bridge 150 is such that a trouble relay winding 184 may be energized when the output of the Wheatstone bridge is of one polarity and an alarm relay winding 182 may be energized when the output of the Wheatstone bridge is of a second polarity. In the apparatus of FIGURE 3, the polarity of the output of Wheatstone bridge is dependent upon the resistance present in the leg of the bridge between output terminal 157 and input terminal 148. Wheatstone bridge 150 is initially balanced so that the output appearing across output terminals 157 and 156 is essentially zero by adjusting the wiper 155 associated with resistance 154 to thereby balance the current flow through the respective arms of the Wheatstone bridge in a manner well known to thoe skilled in the art.

From a consideration of FIGURE 4, it is noted that the resistance connected in the variable leg of the Wheatstone bridge between terminals 148 and 157 remains essentially constant due to the synchronous operation of the variable impedances as combined with the fixed impedance. Upon an increase or decrease in the resistance of the circuits connected to the output terminals 123 and 124 of central station 120, as would be occasioned by an opening in the line or an opening of switch 202 or a closing of the contacts associated with detectors 215 and 216. The output of Wheatstone bridge will be modified to the extent that for one condition, namely an increase in resistance, a current will flow from terminal 157 to terminal 156 through a circuit including diode 187 and trouble relay winding 184 to thereby close its associated contacts to provide an indication that an intrusion or trouble condition exists. Upon a decrease in resistance, a current will flow from terminal 156 to terminal 157 in a reverse direction and the current flow will be through diode 192 and alarm relay winding 182 to thereby cause it to close its associated contacts to provide an indication of an alarm condition.

Again, it may be noted that for an unauthorized person to attempt to defeat the alarm system, it would be necessary for him to have knowledge of the values of the variable resistance units and also determine the frequency with which they cyclically vary and also be able to determine the respective phasing arrangement so as to be able to insert a dummy impedance that would satisfy the central supervisory station 120 in a manner that would not provide an indication of such tampering. It is clear that this possibility is so unlikely that our invention may be considered to be tamper and defeat proof to unauthorized modification.

Figure 5:
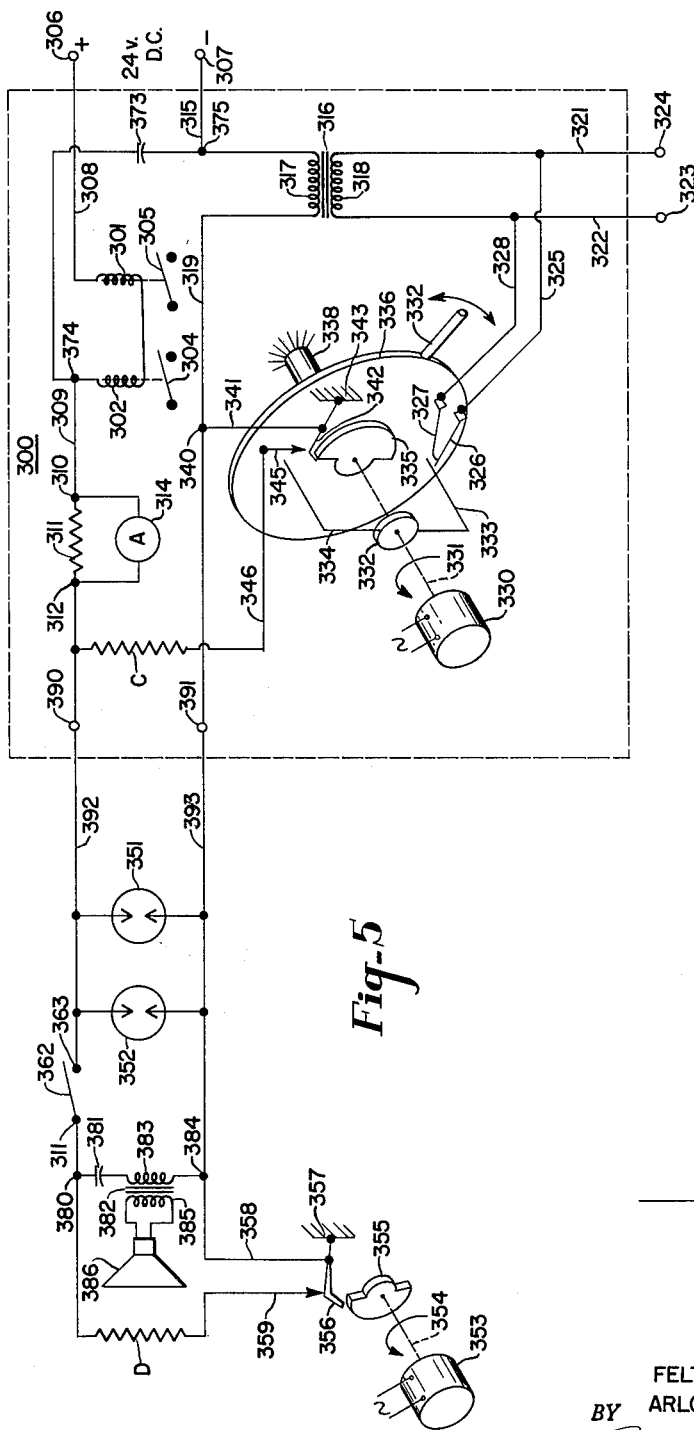
FIGURE 5 is a schematic drawing of a further embodiment of our invention.
Figure 6:
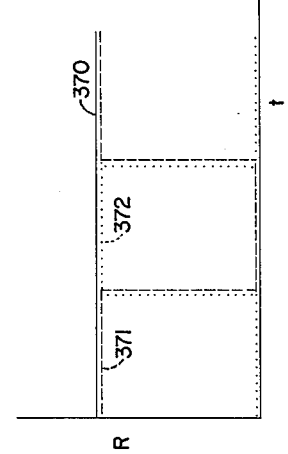
FIGURE 6 is a graphical representation of the operation of the supervisory operation of FIGURE 5.

A still further embodiment of our invention is illustrated in FIGURES 5 and 6. FIGURE 5 includes a central supervisory station 300 shown enclosed in dotted line that is connected to a remote location to be supervised, in this case the remote location includes parallel connected normally open condition responsive devices, series connected normally closed condition responsive devices and means operable to transmit and receive audible signals in addition to apparatus adapted to coact with further apparatus at the central supervisory station for providing a tamper proof supervision of the electrical circuit connected therebetween.

The apparatus of FIGURE 5 includes, a pair of terminals 306 and 307 adapted to be energized from a suitable source of direct current of the polarity indicated. A pair of output terminals 390 and 391 are connected to suitable transmission lines to the remote supervised station, or area. Further terminals 323 and 324 connected to secondary winding 318 of transformer 316 through leads 322 and 321 respectively are provided connection to suitable means for transmitting and receiving audio signals such means might be, for instance, the usual commercially available intercommunication master station. Output terminal 390 is connected to terminal 306 through lead 308, alarm relay winding 301, supervisory relay winding 302, terminal 374, lead 309, terminal 310, resistor 311, and terminal 312. Resistor 311 has connected in parallel therewith a meter adapted to measure the potential across the resistor 311 and thereby providing an indication of the current flow through resistor 311. Output terminal 391 is connected to terminal 307 through lead 315, terminal 375, winding 317 on transformer 316, lead 319, and terminal 340. A capacitor 373, of suitable value, is connected between terminal 374 and lead 309 and terminal 375 on lead 315 to provide a bypass for the audio signals to be applied to winding 317 of transformer 316. Alarm relay contact 305 and supervisory relay contact 304 are shown in the normal energized position of the respective relays. A pair of contactor means comprising stationary contact 345 and movable contact 342 and stationary 326 and movable contact 327 respectively are mounted in a predetermined relationship upon a mounting means 336. Mounting means is mounted for rotation about its axial mounting 333 in a direction shown by the arrow shown in close proximity to the adjusting handle 337. A first cam member 335, mounted for rotation about an axis coincident with the axis of mounting means 336, is positioned so as to actuate movable contact 342 about its axis of mounting 343 so as to alternately open and close the circuit connected to the movable contact 342 and stationary contact 345. A second cam means 332 having driving arms 333 and 334 is adapted to operate movable contact 327 so as to momentarily close a shunt circuit connected across winding 318 of transformer 316 including lead 325, stationary contact 326, movable contact 327 and lead 328. Cam means 335 and 332 are positioned to rotate in a predetermined relationship with one another and to driving means 331 in the direction indicated by the arrow applied thereto. Driving means 331 is connected to motor 330 that may be suitably energized from a suitable supply of alternating current.

Output terminals 390 and 391 on central supervisory station 300 are connected to a remotely located area to be supervised through a circuit including lead 392, terminal 363, normally closed switch 362, terminal 311, terminal 380, resistor D, stationary contact 359, movable contact 356, lead 358, terminal 384 and the lead 393. A pair of normally open condition responsive devices 351 and 352 are connected in parallel across conductors 392 and 393. Transformer winding 383 on transformer 382 is connected intermediate terminals 380 and 384 through a capacitor means 381. Winding 385 on transformer 382 is connected to a loudspeaker means 386. Movable contact 356 is operative about axis 357 in accordance with the position of cam means 355 that is driven from synchronous motor means 353, in the direction shown, through driving means 354. Motor means 353 may be energized from a suitable source of alternating current.

The curves in FIGURE 6 illustrate the variation in the shunt resistances C and D connected across the security alarm circuit as curves 371 and 372 respectively. Curve 370 illustrates the constant resistance as might be seen from terminals 306 and 307 and therefore by supervisory relay winding 302.

Operation of FIGURE 5

In a manner similar to the above described apparatus, the normal supervised operation of the apparatus of FIGURE 5 is such that a predetermined value of current is caused to flow through the series connected alarm and supervisory relay windings 301 and 301 respectively. The value of the current is such that it will energize supervisory relay winding 302 to an extent that the contacts associated therewith are maintained in an open condition and its value will not be great enough to energize alarm relay winding 301 to an extent that it will close its associated contacts 305. In this particular embodiment, it may be noted from FIGURE 6 that the resistances C and D are alternately inserted and removed in parallel with the supervisory and alarm relays so as to provide a constant impedance in series with the relays at all times so that a constant current is caused to flow in the circuit at all times. Since the supervisory relay winding 302 is responsive to deviations below a predetermined value of current, it is important that the impedances C and D be inserted and removed from the circuit in a complementary synchronous manner. This may be accomplished by rotating cams 335 and 355 in a predetermined relationship. Once the predetermined relationship has been attained, the operation of the synchronous drive motors 330 and 353 is such as to maintain the operation of the switching means associated with impedance C and D in synchronism. A series resistance 311, of low value is provided at the central supervisory station to aid in synchronizing the operation of the cams 355 and 335. By noting the variation in current flow through resistance 311, the position of movable contact 342 and stationary contact 345 mounted upon mounting means 336 may be adjusted so that a constant current, determined by the values of one or the other of impedances C and D, may be noted to flow through this resistor to provide a clear indication of synchronism between the respective cams. The operation of the parallel connected detectors 351 and 352 and the series connected detector 362 to sound appropriate alarms is the same as that described above.

The addition of the audio communication and supervisory equipment does not materially affect the operation of the system but adds a sometimes desirable feature of being able to provide two-way communication with the remote location and also audio supervision of such locations. It may be noted that means 332 having arms 333 and 334 mounted thereonto actuates movable contact 327 to momentarily shunt transformer winding 318 on transformer 316. This is utilized to prevent the possibility of audible indication appearing at output terminals 323 and 324 of the operation of movable switch contacts 342 and 356 in operation of the switches controlling the insertion and removal of impedances C and D.

Again, it should be clear to one skilled in the art that it is extremely difficult to defeat the supervisory function of the apparatus of this embodiment by providing equipment similar to that used in the system and connecting it at appropriate locations to disable the security of the remote location. It may be recognized that one additional feature provided by the presence of the additional audible signalling equipment is that interference or tampering with the remotely located equipment is likely to generate noise signals of a nature that will be audible to supervisory personnel at the central station 300 to thereby provide an additional indication of attempted unauthorized modification of the equipment. These and other modifications of our invention will be apparent to those skilled in the art and we therefore wish to be limited only by the scope of the appended claims.

We claim:

1. Apparatus for supervising an electrical circuit comprising: a circuit to be supervised including in series a plurality of variable impedance means; said variable impedance means being connected at intervals in said circuit, alarm means connected to said circuit so as to be responsive to impedance variations in said circuit, means synchronously and complementarily varying said variable impedance means in an inverse relationship so that the total impedance of said circuit remains constant, relay holding means associated with said variable impedance means, impedance synchronizing means for simultaneously energizing said relay holding means to thereby hold said impedance means at complementary fixed values to synchronize the operation of said impedance means; and means for disconnecting said alarm means from said circuit simultaneously with the energization of said relay holding means.

2. A tamper proof supervisory circuit for security systems comprising; a circuit to be supervised, means including a plurality of impedance means connected in series in said circuit for providing a constant normal signal level in said circuit, means including synchronous motors for continuously varying said impedance means in a synchronous and complementary manner to maintain a constant total impedance in said circuit whereby said constant signal is maintained, indicating means, means connecting said indicating means to said circuit, said indicating means being adapted to continuously monitor said signal level and respond to deviations of said signal from said constant level to provide an indication thereof; and synchronizing means including relay holding means for simultaneously synchronizing the operation of said variable impedance means and removing said indicating means from said circuit during said synchronization operation.

3. In a supervised security system having alarm means responsive to a change from normal of the impedance level in said system, the combination comprising: a supervisory station, first means continuously varying the impedance of said station, a circuit to be supervised, second means for continuously varying the impedance of said circuit, means connecting said circuit to said supervisory station, said first and second means including motor means for continuously varying the impedance of said station and said circuit in a synchronously complementary fashion so that the total impedance of said station and said circuit is maintained at a predetermined normal level; and synchronizing means operable from said station for adjusting the impedance of said station and said circuit to assure the complementary operation thereof.

4. In a supervised condition sensing system having a supervisory station and a detection loop, said station including means sensitive to an abnormal signal level in said system, said loop including means adapted to change said signal level upon the sensing of an abnormal condition, means including a plurality of impedance means connected in said system for providing a constant signal level in said system, operating means for continuously varying said plurality of impedance means in a synchronous and complementary manner whereby the total impedance in said system is held constant to maintain said signal at a constant level; and means operable from said station to synchronize the variable operation of said impedance means to maintain said total impedance at said constant level.

5. In a supervised alarm system, an alarm circuit including a pair of wires and a termination impedance, alarm means connected in series with said circuit, a D.C. source, reversible switch means having a first position and a second position, means including said switch means in said first position connecting said source to said circuit to provide a normal level of current flow therethrough in a first direction, means including said switch means in said second position connecting said source to said circuit so as to bypass said alarm means and provide current flow through said circuit in a second direction, said alarm means being responsive to changes from said normal level of current flow in said first direction, a plurality of normally open condition responsive switches connected in parallel with said termination impedance across said circuit to thereby short out said impedance and change said current flow from said normal level upon the detection of an abnormal condition, a first impedance and a second impedance of equal value connected in series in said circuit, a first switch, means connecting said first switch in parallel with said first impedance, first actuating means for said first switch including a synchronous motor and a first cam operated thereby, said first actuating means being adapted to alternately open and close said first switch at a predetermined rate, a second switch, means connecting said second switch in parallel with said second impedance, second actuating means for said second switch including a synchronous motor and a second cam operated thereby, said second actuating means alternately closing and opening said second switch at a rate equal to that of said first switch; and synchronization means for said first and second actuating means comprising, a first relay winding and a first armature operable thereby, a second relay winding and a second armature operable thereby, said first armature holding said first switch open upon the energization of said first relay winding, said second armature holding said second switch closed upon the energization of said second relay winding, a first diode connected in series with said first impedance so as to pass current in said first direction, a second diode connected in series with said second impedance so as to pass current in said first direction, means connecting said first relay winding in parallel with said first diode; and means connecting said second relay winding in parallel with said second diode, said relay windings becoming energized only upon the flow of current in said second direction to operate said armatures to thereby hold and synchronize said first and second switches, said switches thereafter opening and closing in alternate and opposite fashion to maintain a constant impedance level in said circuit.

6. In a supervised alarm system, an alarm circuit including a pair of wires and a terminatin impedance, a Wheatstone bridge, said alarm circuit forming one leg of said bridge, alarm means connected across opposing terminals of said bridge to detect the unbalance thereof, a D.C. source, reversible switch means having a first position and a second position, means including said switch means in said first position connecting said source to said bridge to provide a normal level of current flow through said circuit in a first direction, means including said switch means in said second position connecting said source to said circuit so as to bypass said bridge and provide current flow through said circuit in a second direction, a plurality of normally open condition responsive switches connected in parallel with said termination impedance across said circuit to thereby short out said impedance and unbalance said bridge upon the detection of an abnormal condition, a first variable impedance and a second variable impedance of equal maximum value connected in series with said circuit, actuating means for said first variable impedance adapted to change the value of said impedance in a continuously varying manner at a predetermined rate, actuating means for said second variable impedance adapted to change the value of said impedance in a continuously varying manner at the same predetermined rate; and synchronization means for said first and second variable impedances comprising, a first relay winding and a first armature operable thereby, a second relay winding and a second armature operable thereby, said first armature holding said first variable impedance at a fixed value upon the energization of said first relay winding, said second armature holding said second variable impedance at a complementary fixed value upon the energization of said second relay winding, a first diode connected in series with said first impedance so as to pass current in said first direction, a second diode connected in series with said second impedance so as to pass current in said first direction, means connecting said first relay winding in parallel with said first diode, and means connecting said second relay winding in parallel with said second diode, said relay windings becoming energized only upon the flow of current in said second direction to operate said armatures and thereby hold and synchronize said variable impedances, said variable impedances thereafter changing in alternate and complementary fashion to maintain a constant impedance level in said circuit.

7. In a supervised alarm system, alarm circuit including a pair of wires and a termination impedance, alarm means, means connecting said alarm means to said circuit, a D.C. source, means connecting said source to said circuit to provide a normal level of current flow therethrough, said alarm means being responsive to changes from said normal level of current flow in said circuit, a plurality of condition responsive switches connected in said circuit adapted to change said current flow from said normal level upon the detection of an abnormal condition, a first impedance and a second impedance connected in series in said circuit, a first synchronous motor, means operable by the rotation of said motor to vary said first impedance in a predetermined manner, a second synchronous motor, means operable by the rotation of said second motor to vary said second impedance in such a manner that the total impedance in said circuit remains constant; and synchronization means for said first and second impedances comprising, a first relay winding and a first armature operable thereby, a second relay winding and a second armature operable thereby, said first armature holding said first impedance at a fixed value upon the energization of said first relay winding, said second armature holding said second impedance at a complementary fixed value upon the energization of said second relay winding, a first diode connected in series with said first impedance so as to pass current in a first direction, a second diode connected in series with said second impedance so as to pass current in said first direction, means connecting said first relay winding in parallel with said first diode; means connecting said second relay winding in parallel with said second diode; and means for reversing the direction of current flow in said circuit while simultaneously disconnecting said alarm means from said circuit, said relay windings becoming energized only upon said reversal of current flow to operate said armatures to thereby synchronize said first and second impedances, said first and second impedances thereafter varying in alternate and opposite fashion to maintain a constant impedance level in said circuit.

8. In security apparatus, a detector circuit including a pair of wires and a first termination impedance, a second circuit including a pair of wires and a second termination impedance of equal value to said first termination impedance, a supervisory station, means including a pair of switches operated by motor driven cams for alternately connecting said detector circuit and said second circuit to said supervisory station, a source of power, means connecting said source to said supervisory station to provide a constant level of current flow through said station and through either said detector circuit or said second circuit, alarm means connected in series with said station, said alarm means being responsive to a change from said constant level of said current flow through said station; and means to delay the operation of at least one of said switches to synchronize the alternate connection of said circuits to said station whereby a constant flow of current through said station is maintained.

References Cited in the file of this patent
UNITED STATES PATENTS

| | | |
|---|---|---|
| 642,362 | Pfatischer | Jan. 30, 1900 |
| 791,961 | Weatherby | June 6, 1905 |
| 2,655,646 | Callahan | Oct. 13, 1953 |
| 2,679,635 | Hart | May 25, 1954 |
| 2,707,275 | Loft | Apr. 26, 1955 |
| 2,713,157 | Collins | July 12, 1955 |
| 2,819,410 | Haner | Jan. 7, 1958 |